United States Patent
Shirahama

(10) Patent No.: US 8,063,950 B2
(45) Date of Patent: Nov. 22, 2011

(54) IMAGING APPARATUS, WAVEFORM SIGNAL DISPLAY METHOD, STORAGE MEDIUM, AND INTEGRATED CIRCUIT

(75) Inventor: Hiroshi Shirahama, Osaka (JP)

(73) Assignee: Panasonic Corporation, Osaka (JP)

( * ) Notice: Subject to any disclaimer, the term of this patent is extended or adjusted under 35 U.S.C. 154(b) by 563 days.

(21) Appl. No.: 12/348,500

(22) Filed: Jan. 5, 2009

(65) Prior Publication Data

US 2009/0207273 A1 Aug. 20, 2009

(30) Foreign Application Priority Data

Feb. 15, 2008 (JP) ................. 2008-034137

(51) Int. Cl.
*H04N 9/73* (2006.01)
*H04N 5/222* (2006.01)
*H04N 5/235* (2006.01)
*G03B 7/00* (2006.01)

(52) U.S. Cl. ............ 348/223.1; 348/370; 348/371; 348/362

(58) Field of Classification Search ......... 348/223.1, 348/333.01–333.13, 370–371
See application file for complete search history.

(56) References Cited

U.S. PATENT DOCUMENTS

| | | | | |
|---|---|---|---|---|
| 5,182,636 A * | 1/1993 | Kikuchi et al. | ............ | 348/225.1 |
| 5,430,482 A * | 7/1995 | Kim | ............ | 348/333.01 |
| 5,481,302 A * | 1/1996 | Yamamoto et al. | ............ | 348/223.1 |
| 5,526,048 A * | 6/1996 | Yamamoto | ............ | 348/223.1 |
| 5,555,022 A * | 9/1996 | Haruki et al. | ............ | 348/223.1 |
| 6,108,037 A * | 8/2000 | Takei | ............ | 348/224.1 |
| 6,670,987 B1 * | 12/2003 | Taura | ............ | 348/223.1 |
| 6,963,632 B2 * | 11/2005 | Kendall | ............ | 378/141 |
| 7,006,135 B2 * | 2/2006 | Ishimaru et al. | ............ | 348/223.1 |
| 2003/0071966 A1 * | 4/2003 | Matsumoto | ............ | 351/206 |
| 2003/0151758 A1 * | 8/2003 | Takeshita | ............ | 358/1.9 |
| 2004/0212691 A1 * | 10/2004 | Sato | ............ | 348/223.1 |
| 2007/0085911 A1 * | 4/2007 | Nakamura | ............ | 348/223.1 |

FOREIGN PATENT DOCUMENTS

| | | |
|---|---|---|
| JP | 3-171993 | 7/1991 |
| JP | 6-38222 | 2/1994 |
| JP | 6-54341 | 2/1994 |

* cited by examiner

*Primary Examiner* — Jason Chan
*Assistant Examiner* — Tuan Le
(74) *Attorney, Agent, or Firm* — Wenderoth, Lind & Ponack, L.L.P.

(57) ABSTRACT

An imaging apparatus with an automatic adjustment function, such as a white balance adjustment function, enables a result of such adjustment to be checked easily using a vector display. A waveform generation unit 3 generates a vector signal from a video signal in response to an operation to push a switch unit 6 for automatic adjustment of white balance etc., and outputs the vector signal for a predetermined period. A synthesized signal generation unit 4 combines (superimposes) the video signal with (on) the vector signal and displays the synthesized signal on a display unit 5. A vector display superimposed on a video is performed on the display unit 5 for the predetermined period after the switch is pushed. This enables an adjustment result of white balance etc. to be checked easily without requiring other operations. The vector display is stopped automatically after the predetermined period, and thus does not disturb an imaging operation.

6 Claims, 14 Drawing Sheets

IMAGING APPARATUS, WAVEFORM SIGNAL DISPLAY METHOD, STORAGE MEDIUM, AND INTEGRATED CIRCUIT

This application claims priority to Japanese Patent Application No. 2008-34137 filed on Feb. 15, 2008, the entire disclosure of which is hereby incorporated herein by reference.

BACKGROUND OF THE INVENTION

1. Field of the Invention

The present invention relates to an imaging apparatus with an automatic video adjustment function (for example, white balance adjustment and black balance adjustment), and in more detail, to an imaging apparatus, a waveform signal display method, a storage medium, and an integrated circuit that enable a result of automatic video adjustment to be checked easily.

2. Description of the Related Art

A conventional imaging apparatus with an automatic white balance adjustment function automatically adjusts white balance in response to an operation of a special switch for automatic adjustment. However, the conventional imaging apparatus may not always adjust white balance in an optimum manner. The conventional imaging apparatus may fail to adjust white balance in an optimum manner when, for example, processing an image captured in an environment with a plurality of light sources.

The user of the imaging apparatus can visually check a result of white balance adjustment on a display device or an external monitor of the imaging apparatus. However, to check the adjustment result more precisely, the user is required to connect an external device, such as a vectorscope, to the imaging apparatus. The user then can check the adjustment result by viewing a vector display on the external device.

Patent Citation 1 discloses an imaging apparatus that internally generates a vector signal and displays the vector signal on a display device of the imaging apparatus. FIG. 14 shows the structure of the conventional imaging apparatus 900 described in Patent Citation 1.

As shown in FIG. 14, the conventional imaging apparatus 900 includes a color difference signal conversion unit 91, a conversion circuit 92, an addition circuit 94, a display unit (display device) 95, and a display switch 93. The color difference signal conversion unit 91 generates a color difference signal Sig92 from a video signal Sig91. The conversion circuit 92 generates a vector signal using the color signal Sig92 output from the color difference signal conversion unit 91. The addition circuit 94 adds the vector signal generated in the conversion circuit 92 to the video signal Sig1. The display unit 95 displays a video signal output from the addition circuit 94. The display switch 93 is used to switch on and off the vector display. The conventional imaging apparatus 900 enables the user to easily and correctly check the state of white balance adjustment on the display device (display unit) without using an external device, such as a vectorscope.

Patent Citation 1: Japanese Unexamined Patent Publication No. H6-54341

DISCLOSURE OF INVENTION

Technical Problem

However, the structure of the conventional imaging apparatus requires the display switch 93 to be operated to switch on or off the vector display. Thus, to perform automatic white balance adjustment and to check the adjustment result with a vector display, the user is forced to have the inconvenience of operating the automatic adjustment switch and further operating the display switch. When the imaging apparatus is set to constantly perform a vector display, the user is not required to operate the display switch. However, in this case, the vector display may disturb an imaging operation of the user.

To solve the above conventional problem, it is an object of the present invention to provide an imaging apparatus with a video adjustment function, such as an automatic white balance adjustment function, that enables a result of such video adjustment to be checked easily using a vector display.

Technical Solution

A first aspect of the present invention provides an imaging apparatus including a switch that starts a video adjustment process, a video input unit, a signal processing unit, a waveform generation unit, a synthesized signal generation unit, and a display unit.

The video input unit generates a video signal by converting light from a subject. The signal processing unit processes the video signal through the video adjustment process in accordance with an input from the switch. The waveform generation unit generates a waveform signal based on the video signal processed by the signal processing unit in accordance with the input from the switch and outputs the waveform signal for a predetermined period. The synthesized signal generation unit generates a synthesized signal by combining (superimposing) the video signal and the waveform signal. The display unit displays the synthesized signal.

This imaging apparatus starts the video adjustment process in response to an input from the switch and performs the video adjustment process, superimposes the waveform signal on the video, and displays the waveform signal superimposed on the video on the display unit. This structure enables the user to easily check the adjustment result with the waveform signal without required to perform other inconvenient operations. The waveform signal display is automatically stopped after a predetermined period. This structure therefore prevents the waveform signal display from disturbing an imaging operation of the user.

The processing to generate the synthesized signal by the synthesized signal generation unit refers not only to simply combining (superimposing) the video signal and the waveform signal on each other but also to, for example, generating a signal for displaying the video signal and the waveform signal in different areas (different image areas) of the display screen of the display unit. Examples of the video adjustment process include a white balance adjustment process and a black balance adjustment process.

A second aspect of the present invention provides the imaging apparatus of the first aspect of the present invention in which the predetermined period is equal to or longer than a period from when the signal processing unit starts the video adjustment process to when the signal processing unit stops the video adjustment process.

A third aspect of the present invention provides the imaging apparatus of one of the first and second aspects of the present invention in which the waveform generation unit determines whether an adjustment result of the video adjustment process is valid based on the waveform signal, and changes an output period for which the waveform signal is output based on a result of the determination.

A fourth aspect of the present invention provides the imaging apparatus of one of the first to third aspects of the present invention in which the waveform generation unit sets the output period of the waveform signal as a first period when determining that an adjustment result of the video adjustment process is valid based on the waveform signal, and sets the output period of the waveform signal as a second period longer than the first period when determining that the adjustment result of the video adjustment process is invalid.

This imaging apparatus displays the waveform signal on the display unit for a longer period when the video adjustment process has failed, and enables the user to easily notice the failure in the video adjustment process (adjustment failure).

A fifth aspect of the present invention provides the imaging apparatus of one of the first to fourth aspects of the present invention in which the video adjustment process is a white balance adjustment process or a black balance adjustment process.

A sixth aspect of the present invention provides a waveform signal display method used in an imaging apparatus including a switch that starts a video adjustment process and a video input unit that generates a video signal by converting light from a subject. The waveform signal display method includes a signal processing process, a waveform generation process, a synthesized signal generation process, and a display process.

In the signal processing process, the video signal is processed through the video adjustment process in accordance with an input from the switch. In the waveform generation process, a waveform signal is generated based on the video signal processed by the signal processing unit in accordance with the input from the switch and the waveform signal is output for a predetermined period. In the synthesized signal generation process, a synthesized signal is generated by combining (superimposing) the video signal and the waveform signal. In the display process, the synthesized signal is displayed.

The waveform signal display method has the same advantageous effects as the imaging apparatus of the first aspect of the present invention. Examples of the video adjustment process include a white balance adjustment process and a black balance adjustment process.

A seventh aspect of the present invention provides a storage medium storing a program that enables a computer to implement a waveform signal display method used in an imaging apparatus including a switch that starts a video adjustment process and a video input unit that generates a video signal by converting light from a subject. The waveform signal display method includes a signal processing process, a waveform generation process, a synthesized signal generation process, and a display process.

In the signal processing process, the video signal is processed through the video adjustment process in accordance with an input from the switch. In the waveform generation process, a waveform signal is generated based on the video signal processed by the signal processing unit in accordance with the input from the switch and the waveform signal is output for a predetermined period. In the synthesized signal generation process, a synthesized signal is generated by combining (superimposing) the video signal and the waveform signal. In the display process, the synthesized signal is displayed.

The storage medium storing a program to enable a computer to implement the waveform signal display method has the same advantageous effects as the imaging apparatus of the first aspect of the present invention. Examples of the video adjustment process include a white balance adjustment process and a black balance adjustment process.

An eighth aspect of the present invention provides an integrated circuit used in an imaging apparatus including a switch that starts a video adjustment process and a video input unit that generates a video signal by converting light from a subject. The integrated circuit includes a signal processing unit, a waveform generation unit, a synthesized signal generation unit, and a display unit.

The signal processing unit processes the video signal through the video adjustment process in accordance with an input from the switch. The waveform generation unit generates a waveform signal based on the video signal processed by the signal processing unit in accordance with the input from the switch and outputs the waveform signal for a predetermined period. The synthesized signal generation unit generates a synthesized signal by combining (superimposing) the video signal and the waveform signal. The display unit displays the synthesized signal.

The integrated circuit has the same advantageous effects as the imaging apparatus of the first aspect of the present invention. Examples of the video adjustment process include a white balance adjustment process and a black balance adjustment process.

Advantageous Effects

The imaging apparatus of the present invention with a video adjustment function, such as an automatic white balance adjustment function, automatically performs video adjustment such as white balance adjustment and displays a waveform signal combined with (superimposed on) a video, and enables a result of such video adjustment to be checked easily using a waveform signal without requiring other inconvenient operations. The imaging apparatus of the present invention also automatically stops the waveform signal display after a predetermined period, and therefore prevents the waveform signal display from disturbing an imaging operation.

Figure 1:
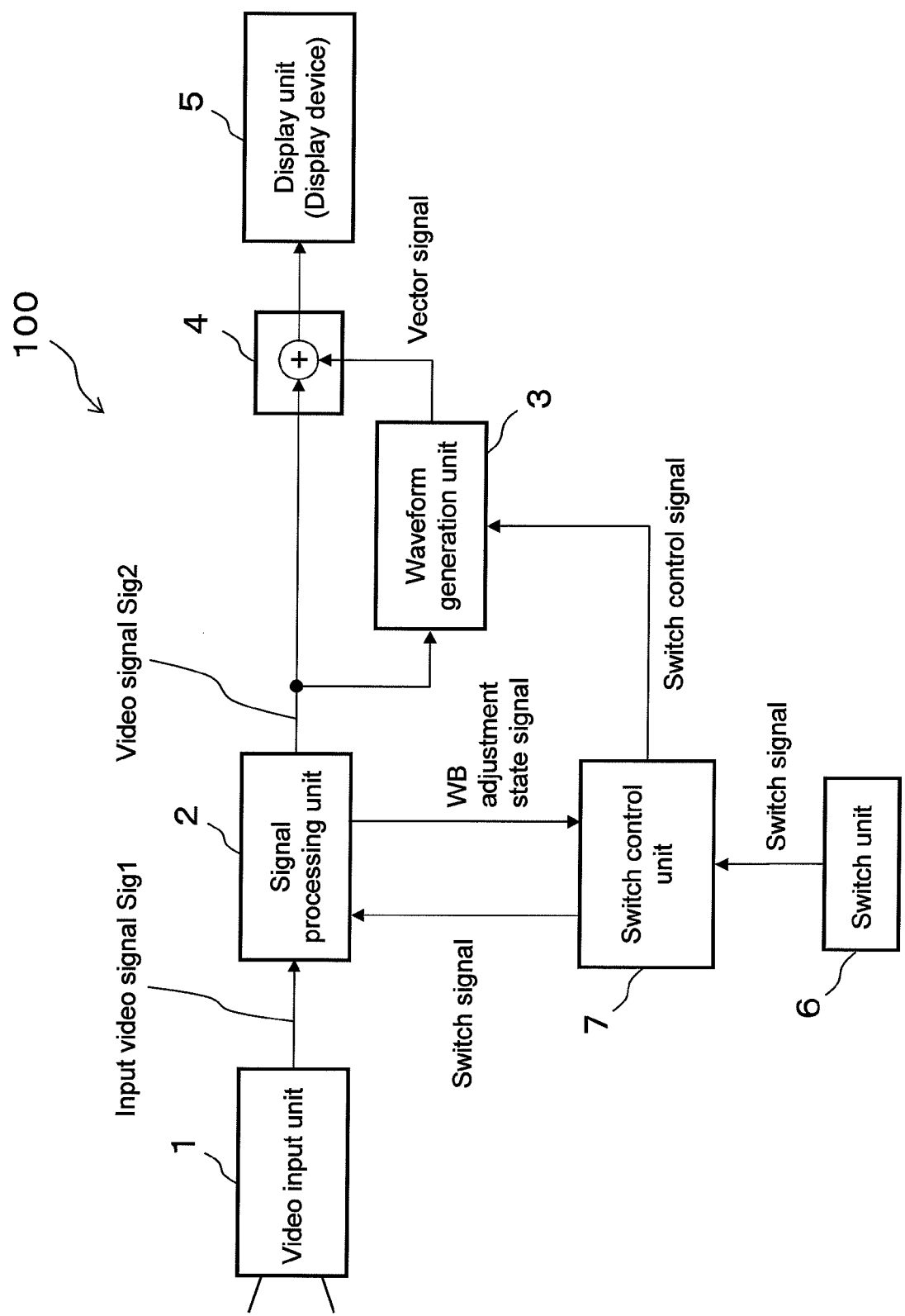
FIG. 1 is a block diagram of an imaging apparatus 100 according to a first embodiment of the present invention.

EXPLANATION OF REFERENCE 100, 200 imaging apparatus
1 video input unit
2 signal processing unit 3, 3A waveform generation unit
4 synthesized signal generation unit
5 display unit (display device)
6 switch unit
7, 7A switch control unit

BEST MODE FOR CARRYING OUT THE
INVENTION

Embodiments of the present invention will now be described with reference to the drawings.

First Embodiment 1.1 Structure of the Imaging Apparatus

FIG. 1 is a block diagram showing the structure of an imaging apparatus 100 according to a first embodiment of the present invention.

As shown in FIG. 1, the imaging apparatus 100 includes a video input unit 1, which converts light from a subject to an input video signal Sig1 and outputs the input video signal Sig1, and a signal processing unit 2, which receives the input video signal Sig1 and processes the input video signal Sig1 through signal processing including A/D conversion, white balance adjustment, RGB/YCbCr conversion, and outputs a video signal Sig2 consisting of luminance and color difference digital signals. The imaging apparatus 100 further includes a waveform generation unit 3, which generates a vector signal from the video signal Sig2, a synthesized signal generation unit 4, which combines (superimposes) an output from the signal processing unit 2 and an output from the waveform generation unit 3, and a display unit (display device) 5, which displays an output from the synthesized signal generation unit 4. The imaging apparatus 100 further includes a switch unit 6 and a switch control unit 7, which controls the signal processing unit 2, the switch unit 6, and the waveform generation unit 3.

The video input unit 1 includes an optical system, which focuses light from a subject (optical system including a lens, an aperture, etc.), and an image sensor, such as a charge-coupled device (CCD) or a complementary metal oxide semiconductor (CMOS). The video input unit 1 converts light focused by the optical system to an input video signal Sig1, which consists of red (R), green (G), and blue (B) analogue electric signals. The video input unit 1 then outputs the input video signal Sig1 to the signal processing unit 2.

Figure 2:
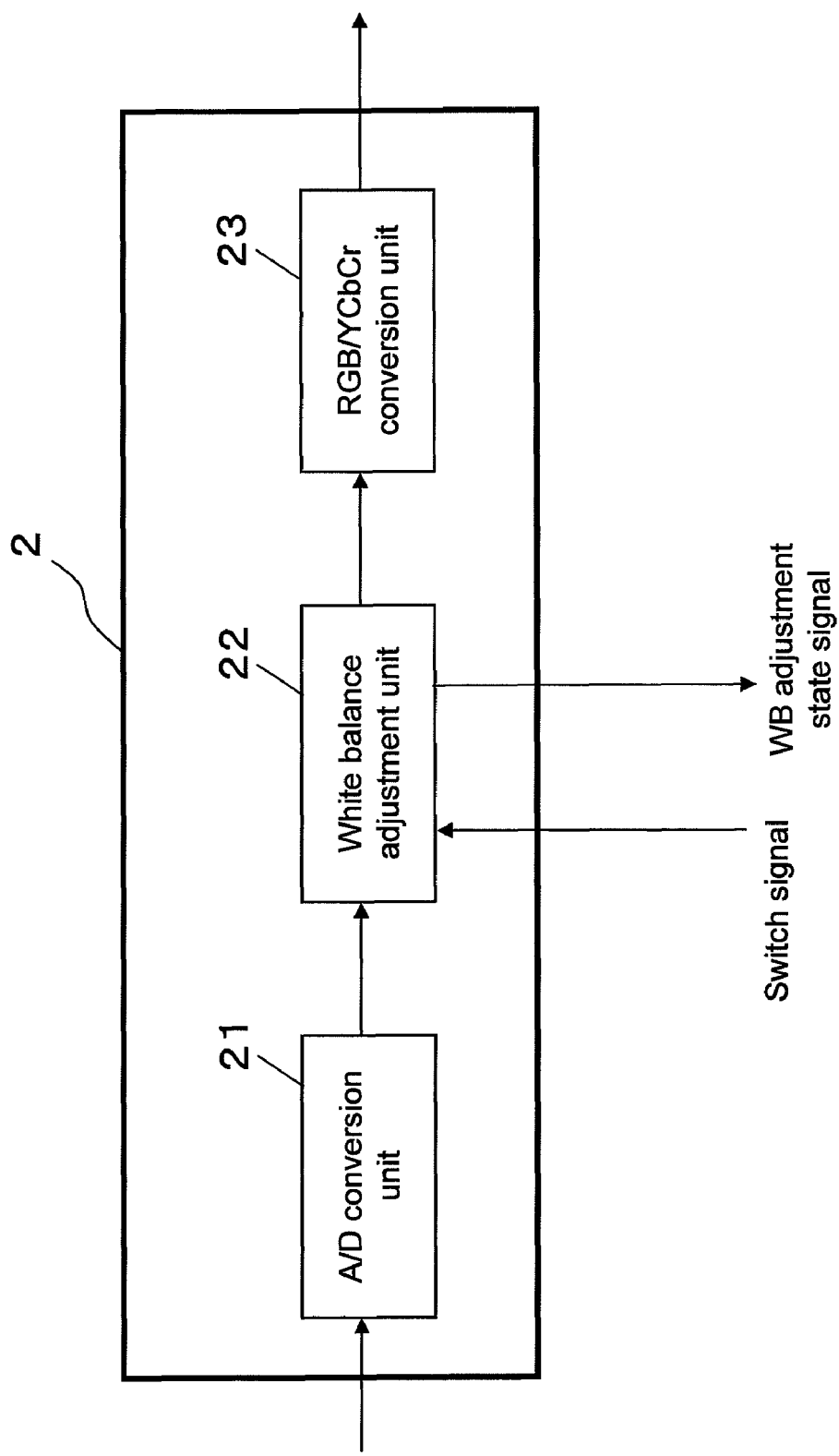
FIG. 2 is a block diagram of a signal processing unit 2 according to the first embodiment.

As shown in FIG. 2, the signal processing unit 2 includes an A/D conversion unit 21, a white balance adjustment unit 22, and an RGB/YCbCr conversion unit 23.

The A/D conversion unit 21 receives the video signal Sig1 (video signal in an RGB format) output from the video input unit 1, and converts the video signal Sig1 through analogue-to-digital (A/D) conversion, and outputs the resulting digital video signal (video signal in an RGB format) to the white balance adjustment unit 22.

The white balance adjustment unit 22 receives the digital video signal output from the A/D conversion unit 21 and a switch signal output from the switch control unit 7, and processes the input digital video signal through a white balance adjustment process based on the switch signal. The white balance adjustment unit 22 then outputs the digital video signal processed through the white balance adjustment process (digital RGB format correction signal) to the RGB/YCbCr conversion unit 23. More specifically, when detecting the down edge of the switch signal, the white balance adjustment unit 22 corrects the digital RGB format video signal output from the A/D conversion unit 21 by adjusting the R, G, and B gains of the signal in an optimum manner and generates a digital RGB format correction signal with an optimal white balance. The white balance adjustment unit 22 outputs the digital RGB format correction signal to the RGB/YCbCr conversion unit 23. White balance adjustment can be achieved with various methods known in the art, which will not be described in this specification.

The white balance adjustment unit 22 outputs a WB adjustment state signal, which indicates the status (state) of the white balance adjustment process, to the switch control unit 7. The white balance adjustment unit 22 outputs the WB adjustment state signal in the manner described in (1) to (4) below.

(1) While performing white balance adjustment, the white balance adjustment unit 22 outputs a value indicating that white balance adjustment is being performed as the WB adjustment state signal.

(2) When completing the white balance adjustment process and white balance adjustment has been successful, the white balance adjustment unit 22 outputs a value indicating that white balance adjustment has been successful as the WB adjustment state signal.

(3) When completing the white balance adjustment process and white balance adjustment has failed, the white balance adjustment unit 22 outputs a value indicating that white balance adjustment has failed as the WB adjustment state signal.

(4) In any cases other than (1) to (3), the white balance adjustment unit 22 outputs no signal (no signal value) as the WB adjustment state signal.

The WB adjustment state signals described above are mere examples, and the present invention should not be limited to these signals.

The RGB/YCbCr conversion unit 23 receives the digital video signal (RGB format video signal) output from the white balance adjustment unit 22, and converts the RGB format video signal to a video signal in a YCbCr format (more specifically, converts the color space of the video signal from the RGB color space to the YCbCr color space). The RGB/YCbCr conversion unit 23 then outputs the video signal resulting from the RGB to YCbCr conversion, that is, the digital video signal consisting of a luminance signal (Y signal) and color difference signals (Cb signal and Cr signal), to the waveform generation unit 3 and the synthesized signal generation unit 4.

Figure 3:
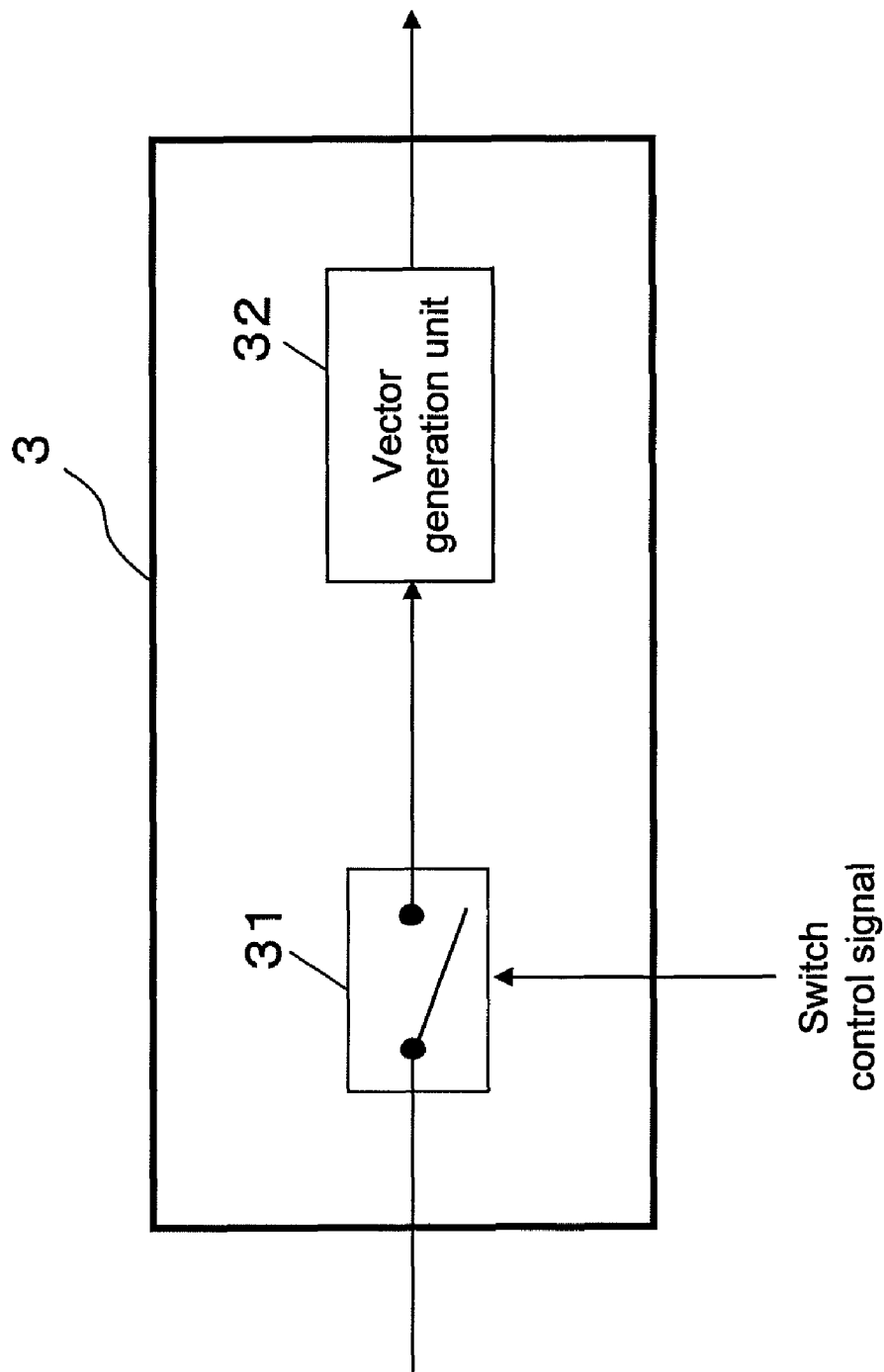
FIG. 3 is a block diagram of a waveform generation unit 3 according to the first embodiment.

As shown in FIG. 3, the waveform generation unit 3 includes a control switch unit 31 and a vector generation unit 32.

The control switch unit 31 receives the digital video signals (Y signal, Cb signal, and Cr signal) output from the RGB/YCbCr conversion unit 23 of the signal processing unit 2 and a switch control signal output from the switch control unit 7, and outputs the digital video signals (Y signal, Cb signal, and Cr signal) to the vector generation unit 32 based on the switch control signal. More specifically, when the switch control signal has a value indicating ON, the control switch unit 31 turns on the control switch, and outputs the digital video signals (Y signal, Cb signal, and Cr signal) input into the control switch unit 31 to the vector generation unit 32. When the switch control signal has a value indicating OFF, the control switch unit 31 turns off the control switch. In this case, the control switch unit 31 does not output the digital video signals (Y signal, Cb signal, and Cr signal) input into the control switch unit 31 to the vector generation unit 32.

Figure 4:
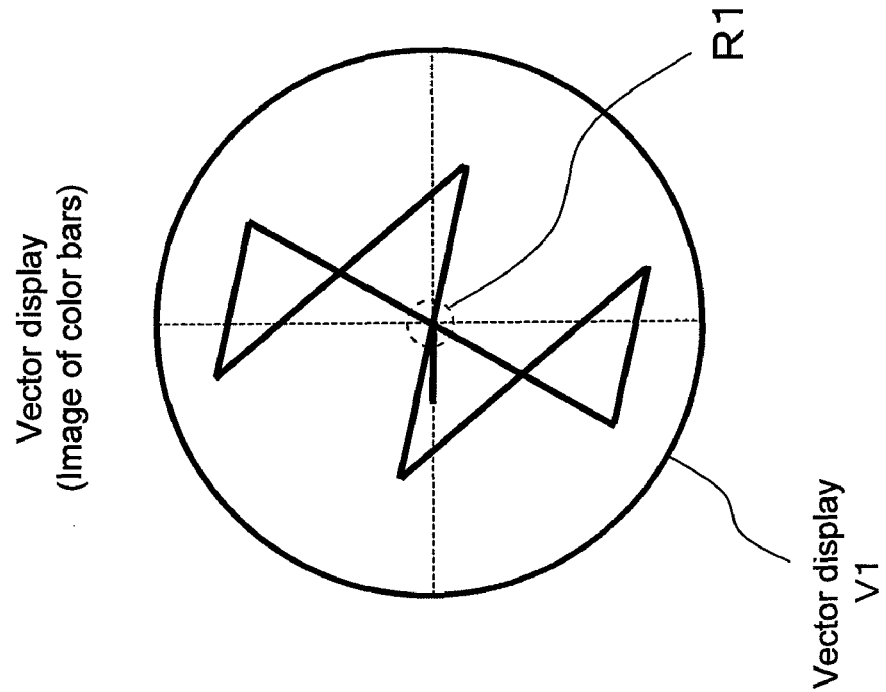
FIG. 4 shows examples of a vector display.
Figure 4:
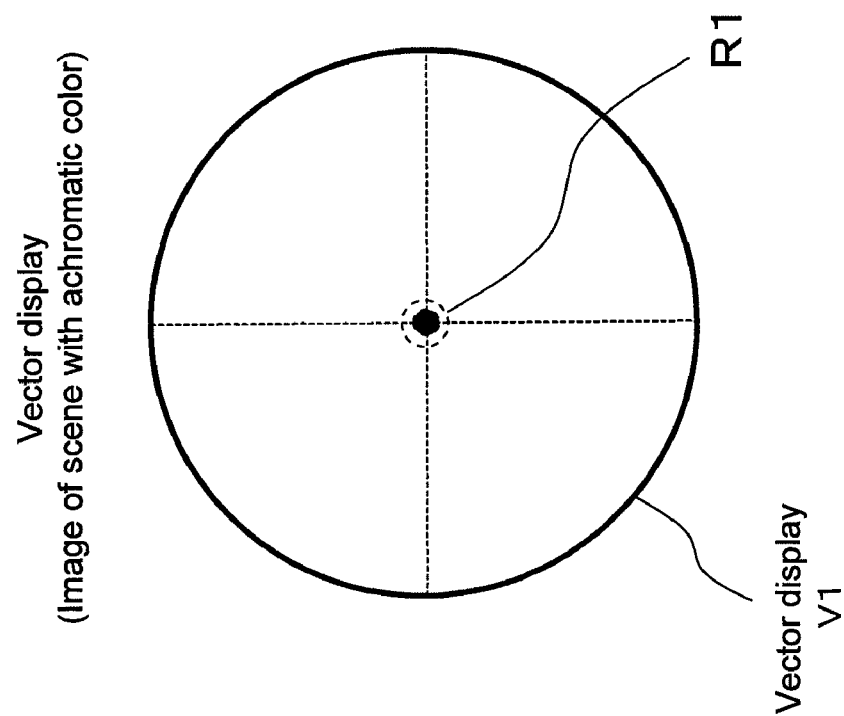

The vector generation unit 32 receives the digital video signals (Y signal, Cb signal, and Cr signal) output from the control switch unit 31, and generates a vector signal from the input digital signals (Y signal, Cb signal, and Cr signal). More specifically, the vector generation unit 32 generates a vector signal using the Cb signal and the Cr signal, which are the color difference signals among the digital video signals (Y signal, Cb signal, and Cr signal), while the control switch unit 31 is on. FIG. 4 shows examples of images (videos) each of which is formed using a vector signal. The vector signal is expressed by plotting the pixels of an image (video) formed using the video signal Sig2 in the graph in which the horizontal axis indicates the Cb component and the vertical axis indicates the Cr component. The vector signal is used to form each display image shown in FIG. 4. In each vector display image shown in FIG. 4 (vector display V1), the distance from the center, that is, the amplitude, indicates a color saturation, and the angle indicates a hue. The vector generation unit 32 outputs the generated vector signal to the synthesized signal generation unit 4.

Figure 5:
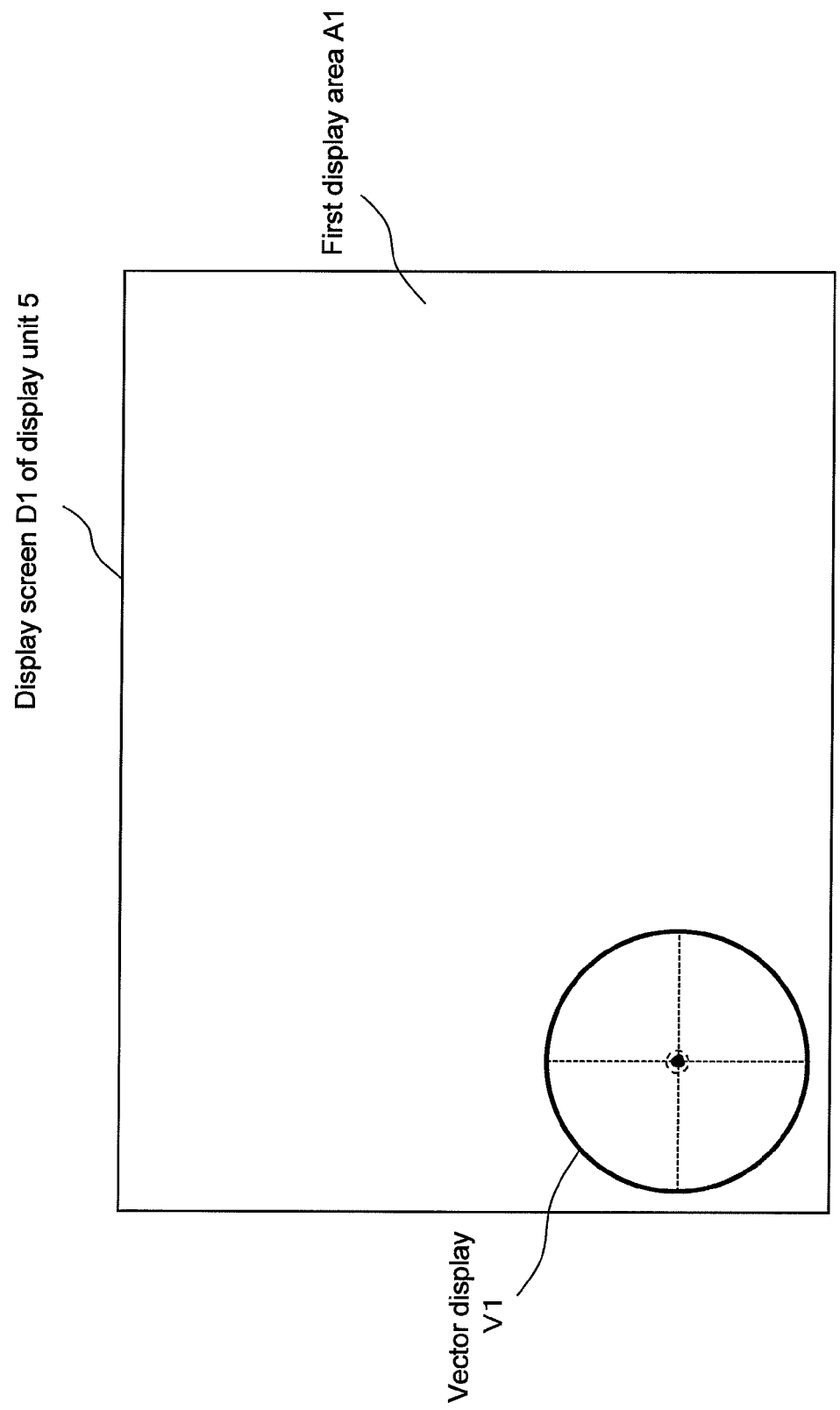
FIG. 5 is a schematic diagram of a display screen of a display unit 5.

The synthesized signal generation unit 4 receives the digital video signals (Y signal, Cb signal, and Cr signal) output from the signal processing unit 2 and the vector signal output from the waveform generation unit 3, combines (synthesizes) the digital video signals and the vector signal to generate a synthesized video signal, and outputs the synthesized video signal to the display unit 5. The synthesized signal generation unit 4 may simply superimpose the digital video signals (Y signal, Cb signal, and Cr signal) output from the signal processing unit 2 on the vector signal output from the waveform generation unit 3 and output the resulting signal to the display unit 5 as the synthesized video signal. FIG. 5 schematically shows one example of the display screen of the display unit 5 on which the synthesized video signal obtained by superimposing the digital video signals on the vector signal is displayed. As shown in FIG. 5, the vector display V1 using the vector signal and the video display using the video signal Sig2 are in the same display area (first display area A1 in FIG. 5).

Figure 6:
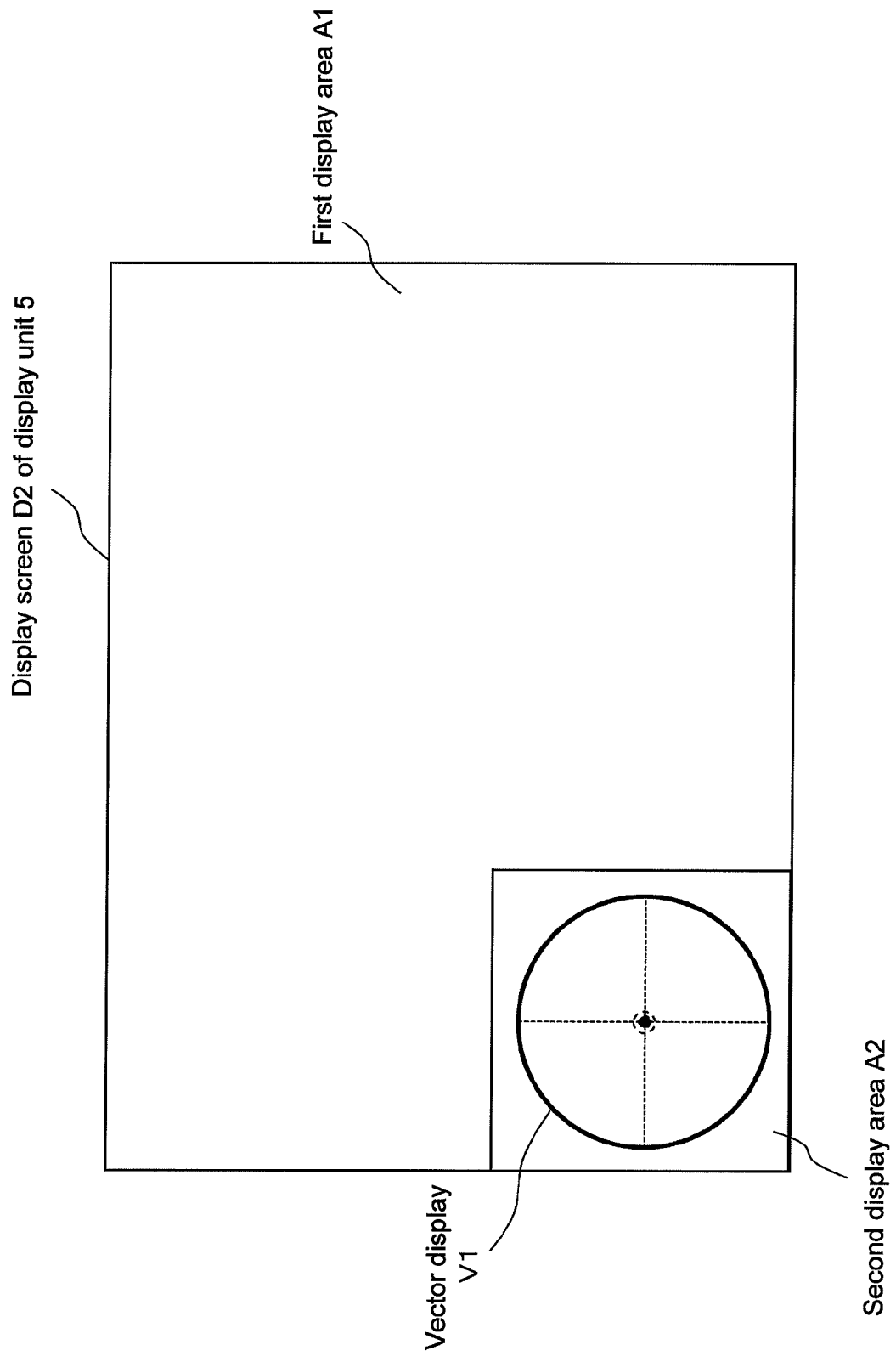
FIG. 6 is a schematic diagram of a display screen of the display unit 5.

Alternatively, the synthesized signal generation unit 4 may use the digital video signals (Y signal, Cb signal, and Cr signal) output from the signal processing unit 2 and the vector signal output from the waveform generation unit 3 to generate a signal with which the vector display using the vector signal and the video display using the video signal Sig2 are in different display areas in the display screen of the display unit 5. FIG. 6 schematically shows one example of the display screen on which the vector display and the video display are in different areas. As shown in FIG. 6, a display screen D2 of the display unit 5 includes a first display area A1 and a second display area A2. The video display using the video signal Sig2 is in the first display area A1, whereas the vector display V1 using the vector signal is in the second display area A2.

The display screen layouts above are mere examples, and the video display and the vector display may be performed on the display screen with other layouts.

The display unit 5 receives the video signal (synthesized video signal) output from the synthesized signal generation unit 4, and displays a video using the input video signal.

The switch unit 6 is formed by a switch for automatically adjusting white balance, which may for example be a push button switch. The switch signal output from the switch unit 6 is at a high level in a normal state. When the switch unit 6 is pushed by the user, the switch signal is set to a low level. The switch signal is output to the switch control unit 7. The user pushes the push button switch of the switch unit 6 to start automatic white balance adjustment in the imaging apparatus 100.

The switch control unit 7 receives the switch signal from the switch unit 6 and the WB adjustment state signal output from the white balance adjustment unit 22 of the signal processing unit 2, and outputs the switch signal from the switch unit 6 to the white balance adjustment unit 22 of the signal processing unit 2. Also, the switch control unit 7 generates a switch control signal based on the WB adjustment state signal, and outputs the switch control signal to the waveform generation unit 3. The functions of the switch control unit 7 may be implemented by a microprocessor or the like.

1.2 Operation of the Imaging Apparatus

The operation of the imaging apparatus 100 with the above-described structure will now be described.

Light from a subject is focused by the optical system included in the video input unit 1. The focused light is then converted to an electric signal (input video signal Sig1, which is a video signal in an RGB format) by the image sensor of the video input unit 1.

The input video signal Sig1 is converted by the A/D conversion unit 21 of the signal processing unit 2 through A/D conversion, and the resulting signal is input into the white balance adjustment unit 22.

The operation of the imaging apparatus 100 will now be described taking two cases: one in which white balance adjustment (hereafter may be referred to as "WB adjustment") performed by the white balance adjustment unit 22 has been successful and the other in which WB adjustment has failed.

1.2.1 When WB Adjustment has been Successful

The operation of the imaging apparatus 100 when WB adjustment has been successful will now be described with reference to FIG. 7.

Figure 7:
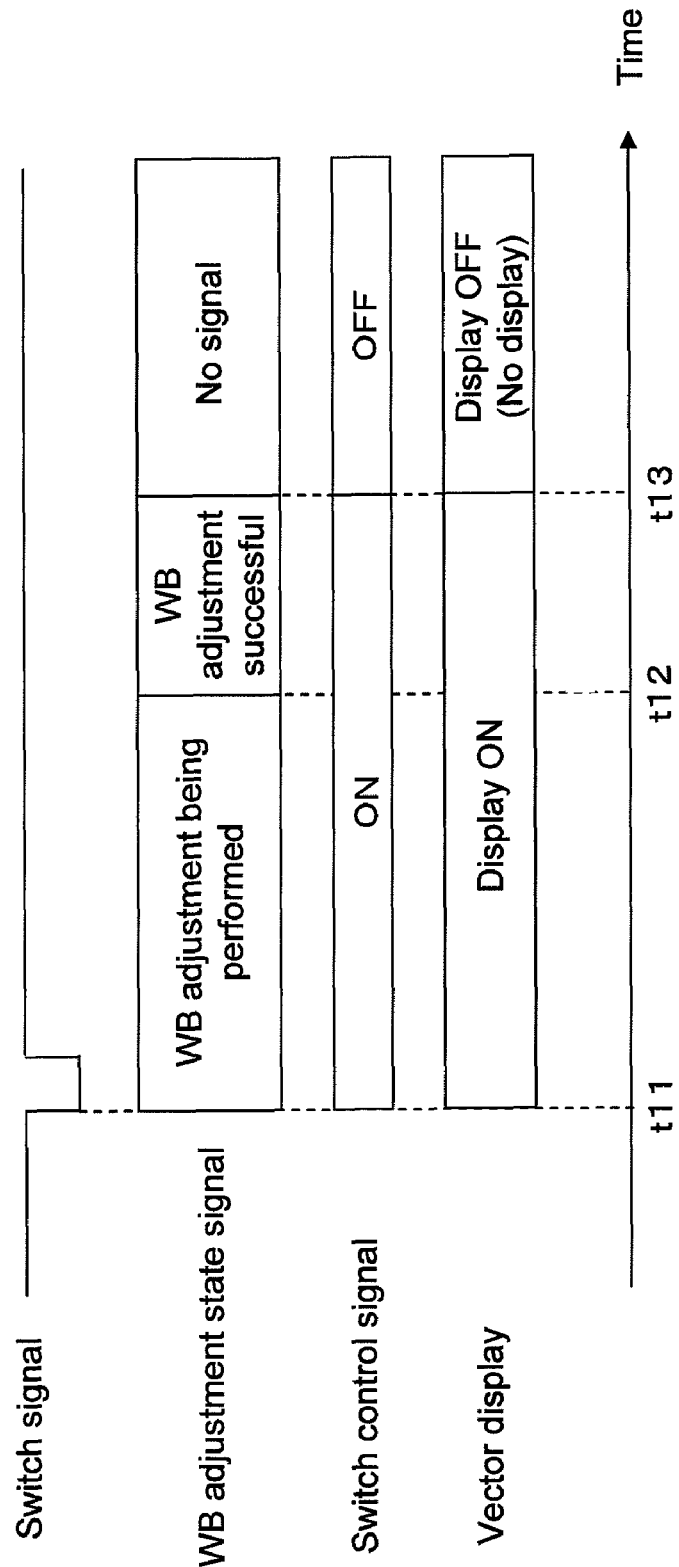
FIG. 7 is a timing chart of signals when WB adjustment has been successful.

FIG. 7 is a timing chart showing the state of the switch signal, the WB adjustment state signal, the switch control signal, and the vector display when WB adjustment has been successful.

At timing t11, when the user pushes the switch unit 6, the switch signal shifts from a high level in a normal state to a low level as shown in FIG. 7. At this timing, the switch signal is output from the switch unit 6 to the switch control unit 7, and is subsequently output from the switch control unit 7 to the white balance adjustment unit 22.

The white balance adjustment unit 22 detects the down edge of the switch signal at timing t11, and starts the WB adjustment process of the digital video signal. When starting the WB adjustment process, the white balance adjustment unit 22 sets the WB adjustment state signal to the value indicating that WB adjustment is being performed, and outputs the WB adjustment state signal to the switch control unit 7.

The switch control unit 7 then sets the switch control signal to the value indicating ON at timing t11, and outputs the switch control signal to the waveform generation unit 3. The control switch unit 31 of the waveform generation unit 3 is then switched on in response to the switch control signal indicating ON. The video signal Sig2 output from the signal processing unit 2 is input into the vector generation unit 32. The vector signal generated by the vector generation unit 32 is then combined with (superimposed on) the video signal Sig2 by the synthesized signal generation unit 4, and the resulting synthesized signal is output to the display unit 5. As a result, the vector display V1 on the display screen of the display unit 5 is started at timing t11.

At timing t12, when the WB adjustment process performed by the white balance adjustment unit 22 is completed and WB adjustment has been successful, the white balance adjustment unit 22 sets the WB adjustment state signal to the value indicating that WB adjustment has been successful, and outputs the WB adjustment state signal to the switch control unit 7. The white balance adjustment unit 22 continues to output the WB adjustment state signal indicating that WB adjustment has been successful for a predetermined period (period from timings t12 to t13 in FIG. 7). In response to the WB adjustment state signal indicating that WB adjustment has been successful, the switch control unit 7 maintains the signal value of the switch control signal indicating ON, and outputs the switch control signal to the waveform generation unit 3. The control switch unit 31 of the waveform generation unit 3 maintains its on state in response to the switch control signal indicating ON. As a result, the video signal Sig2 output from the signal processing unit 2 continues to be input into the vector generation unit 32. The synthesized signal generation unit 4 combines (superimposes) the vector signal generated by the vector generation unit 32 with (on) the video signal Sig2, and continues to output the synthesized signal to the display unit 5. In other words, the vector display V1 on the display screen of the display unit 5 started at timing t11 is continued.

At timing t13, the white balance adjustment unit 22 stops outputting the WB adjustment state signal indicating that WB adjustment has been successful (outputs no signal). The switch control unit 7 detects that the output of the WB adjustment state signal has been stopped, and sets the switch control signal to the value indicating OFF, and outputs the switch control signal to the waveform generation unit 3. The control switch unit 31 of the waveform generation unit 3 is turned off in response to the switch control signal indicating OFF, and cuts an input into the vector generation unit 32, or in other words, sets the vector generation unit 32 to receive no input. In this case, the synthesized signal generation unit 4 outputs only the video signal Sig2 to the display unit 5. As a result, the vector display V1 on the display screen of the display unit 5 is stopped. More specifically, only the video formed using the video signal Sig2 is displayed on the display screen of the display unit 5.

As described above, when WB adjustment has been successful, the imaging apparatus 100 performs the vector display V1 combined with (superimposed on) the video signal on the display screen of the display unit 5 only for a predetermined period. This structure enables the user to easily check the result of automatic white balance adjustment, and also prevents the vector waveform from disturbing an imaging operation of the user.

The state of WB adjustment may for example be determined by the user in the manner described below.

When the imaging apparatus 100 is used to capture an image of a scene with an achromatic color, the user can determine that WB adjustment is performed in an optimum manner if the vector display concentrates in a region around the origin (region R1 in FIG. 4) as shown in the left chart of FIG. 4. When the imaging apparatus 100 is used to capture an image of color bars, the user can determine that WB adjustment is performed in an optimum manner if the center of the vector display is positioned in a region around the origin (region R1 in FIG. 4) as shown in the right chart of FIG. 4.

1.2.2 When WB Adjustment has Failed

The operation of the imaging apparatus 100 when WB adjustment has failed will now be described with reference to FIG. 8.

Figure 8:
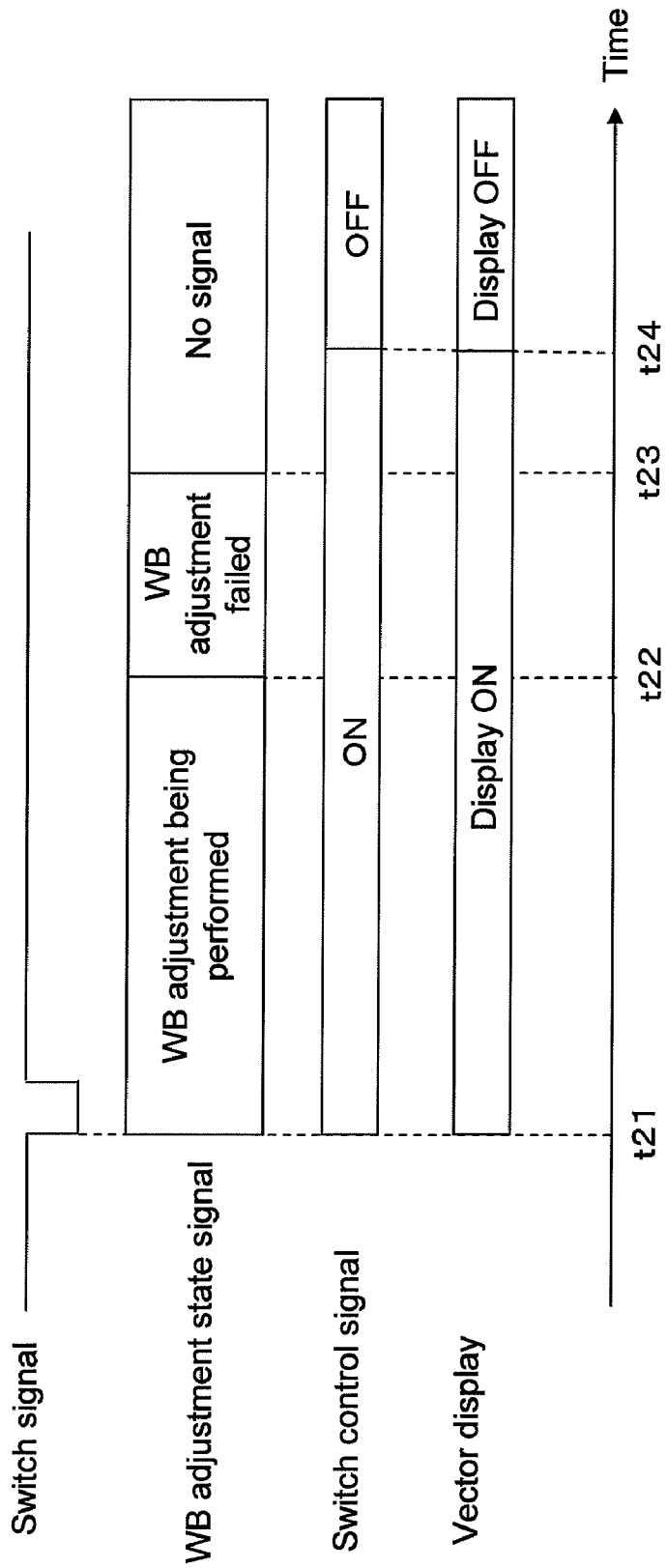
FIG. 8 is a timing chart of signals when WB adjustment has failed.

FIG. 8 is a timing chart showing the state of the switch signal, the WB adjustment state signal, the switch control signal, and the vector display when WB adjustment has failed.

At timing t21, when the user pushes the switch unit 6, the switch signal shifts from a high level in a normal state to a low level as shown in FIG. 8. At this timing, the switch signal is output from the switch unit 6 to the switch control unit 7, and is subsequently output from the switch control unit 7 to the white balance adjustment unit 22.

The white balance adjustment unit 22 detects the down edge of the switch signal at timing t21, and starts the WB adjustment process of the digital video signal. When starting the WB adjustment process, the white balance adjustment unit 22 sets the WB adjustment state signal to the value indicating that WB adjustment is being performed, and outputs the WB adjustment state signal to the switch control unit 7.

The switch control unit 7 then sets the switch control signal to the value indicating ON at timing t21, and outputs the switch control signal to the waveform generation unit 3. The control switch unit 31 of the waveform generation unit 3 is then switched on in response to the switch control signal indicating ON. The video signal Sig2 output from the signal processing unit 2 is input into the vector generation unit 32. The vector signal generated by the vector generation unit 32 is then combined with (superimposed on) the video signal Sig2 by the synthesized signal generation unit 4, and the resulting synthesized signal is output to the display unit 5. As a result, the vector display V1 on the display screen of the display unit 5 is started at timing t21.

At timing t22, when the WB adjustment process performed by the white balance adjustment unit 22 is completed but WB adjustment has failed, the white balance adjustment unit 22 sets the WB adjustment state signal to the value indicating that WB adjustment has failed, and outputs the WB adjustment state signal to the switch control unit 7. The white balance adjustment unit 22 continues to output the WB adjustment state signal indicating that WB adjustment has failed for a predetermined period (period from timings t22 to t23 in FIG. 8). In response to the WB adjustment state signal indicating that WB adjustment has failed, the switch control unit 7 maintains the signal value of the switch control signal indicating ON, and outputs the switch control signal to the waveform generation unit 3. The control switch unit 31 of the waveform generation unit 3 maintains its on state in response to the switch control signal indicating ON. As a result, the video signal Sig2 output from the signal processing unit 2 continues to be input into the vector generation unit 32. The synthesized signal generation unit 4 combines (superimposes) the vector signal generated by the vector generation unit 32 with (on) the video signal Sig2, and continues to output the synthesized signal to the display unit 5. In other words, the vector display V1 on the display screen of the display unit 5 started at timing t21 is continued.

At timing t23, the white balance adjustment unit 22 stops outputting the WB adjustment state signal indicating that WB adjustment has failed (outputs no signal). The switch control unit 7 detects that the output of the WB adjustment state signal has been stopped, and continues to output the switch control signal indicating ON for a predetermined period (period from timings t23 to t24 in FIG. 8). As a result, the vector display V1 started at timing t21 is continued for the period from timings t23 to t24.

At timing t24, the switch control unit 7 sets the switch control signal to the value indicating OFF, and outputs the switch control signal to the waveform generation unit 3. The control switch unit 31 is turned off in response to the switch control signal indicating OFF, and cuts an input into the vector generation unit 32, or in other words sets the vector generation unit 32 to receive no signal. In this case, the synthesized signal generation unit 4 outputs only the video signal Sig2 to the display unit 5. As a result, the vector display V1 on the display screen of the display unit 5 is stopped. More specifically, only the video formed using the video signal Sig2 is displayed on the display screen of the display unit 5.

As described above, when WB adjustment has failed, the imaging apparatus 100 performs the vector display V1 on the display screen of the display unit 5 for a longer period than when WB adjustment has been successful. This structure enables the user to easily check the result of automatic white balance adjustment, and enables the user to easily notice the failure in automatic WB adjustment. As a result, the user can avoid producing an unfavorable image using the imaging apparatus 100.

As described above, the imaging apparatus 100 of the present invention automatically adjusts white balance and performs the vector display combined with (superimposed on) the video in response to an operation to push the automatic white balance adjustment switch (switch unit 6). This structure eliminates the inconvenience of operating another switch for tuning on and off the vector display to check a result of WB adjustment. The imaging apparatus 100 therefore enables the user to easily check the WB adjustment result without required to perform an inconvenient operation. Further, the imaging apparatus 100 stops the vector display automatically after a predetermined period. This structure therefore prevents the vector display from disturbing an imaging operation of the user.

Although the present invention is applied to WB adjustment in the above embodiment, the present invention is also applicable to black balance adjustment. To apply the present invention to black balance adjustment, it is only required that the switch unit 6 function as a switch for automatically adjusting black balance and the white balance adjustment unit 22 function as a black balance adjustment unit.

When the imaging apparatus 100 performs black balance adjustment, it is preferable that the waveform generation unit 3 generates a waveform instead of a vector. More specifically, it is preferable that the waveform generation unit 3 performs a waveform display in black balance adjustment, although the waveform generation unit 3 performs a vector display in WB adjustment. The waveform display enables the user to easily check whether the black level (the level when white constitutes 0%) is adjusted in an optimum manner.

Figure 9:
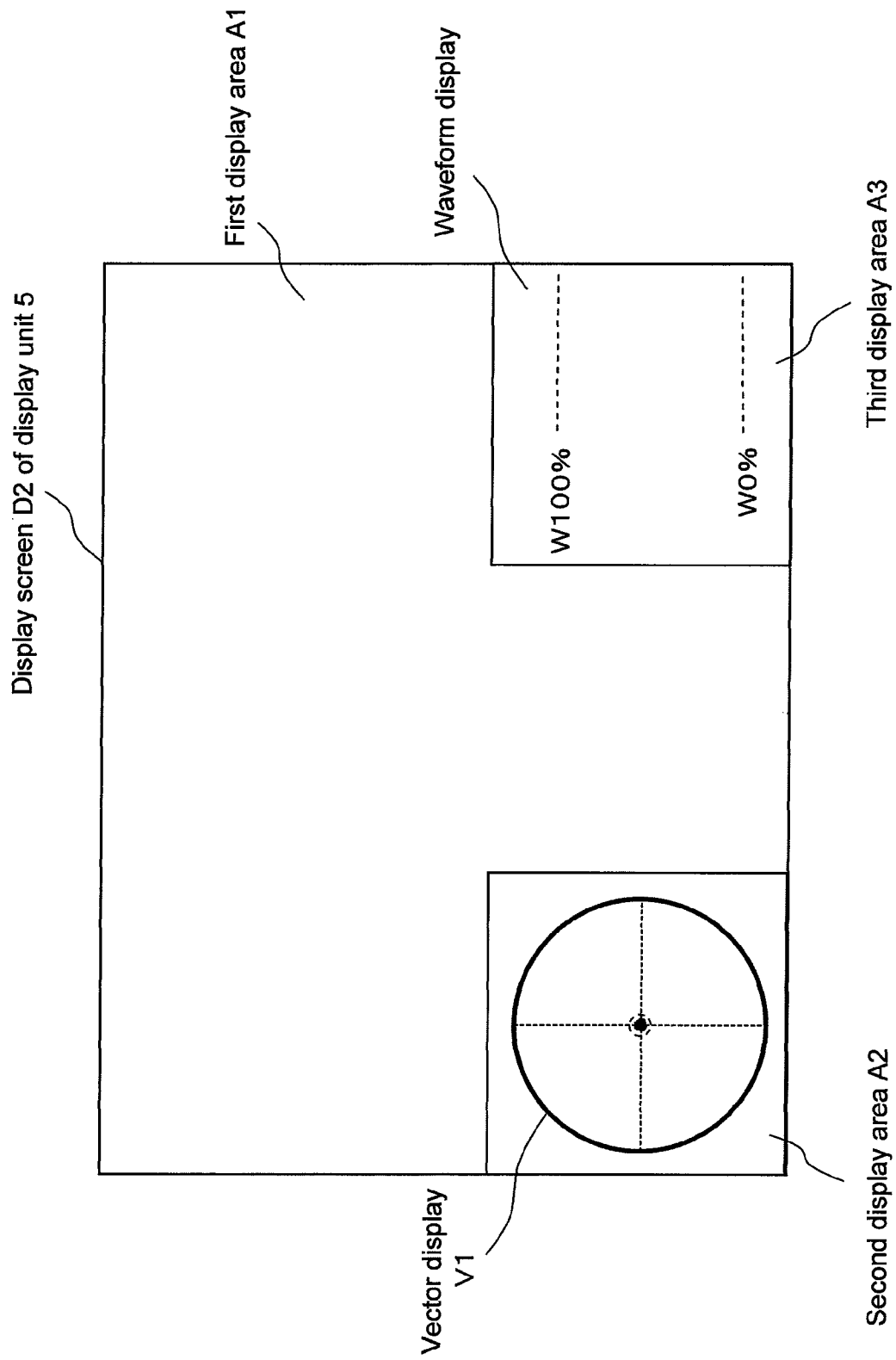
FIG. 9 is a schematic diagram of a display screen of the display unit 5.

The imaging apparatus 100 may also perform both WB adjustment and black balance adjustment, and may perform both a vector display and a waveform display on the display unit 5. For example, as shown in FIG. 9, the vector display may be in a second display area A2, and the waveform display may be in a third display area A3, which is provided separately from the second display area A2.

The waveform display is typically expressed using any single line or any plurality of lines (or all lines) of a video signal in the graph in which the vertical axis indicates the luminance signal Y and the horizontal axis indicates the horizontal direction of a video formed using the video signal.

The control switch unit 31 of the imaging apparatus 100 is turned off (in other words, the vector display is turned off) when a predetermined period (period from timings t11 to t13 in FIG. 7 or period from timings t21 to t24 in FIG. 8) elapses after the down edge of the switch signal is detected in the above embodiment. However, the user may set the period to elapse before the control switch unit 31 is turned off (vector display is turned off). The user may also set the period from timings t23 to t24 in FIG. 8.

Second Embodiment

A second embodiment of the present invention will now be described with reference to the drawings.

2.1 Structure of the Imaging Apparatus

Figure 10:
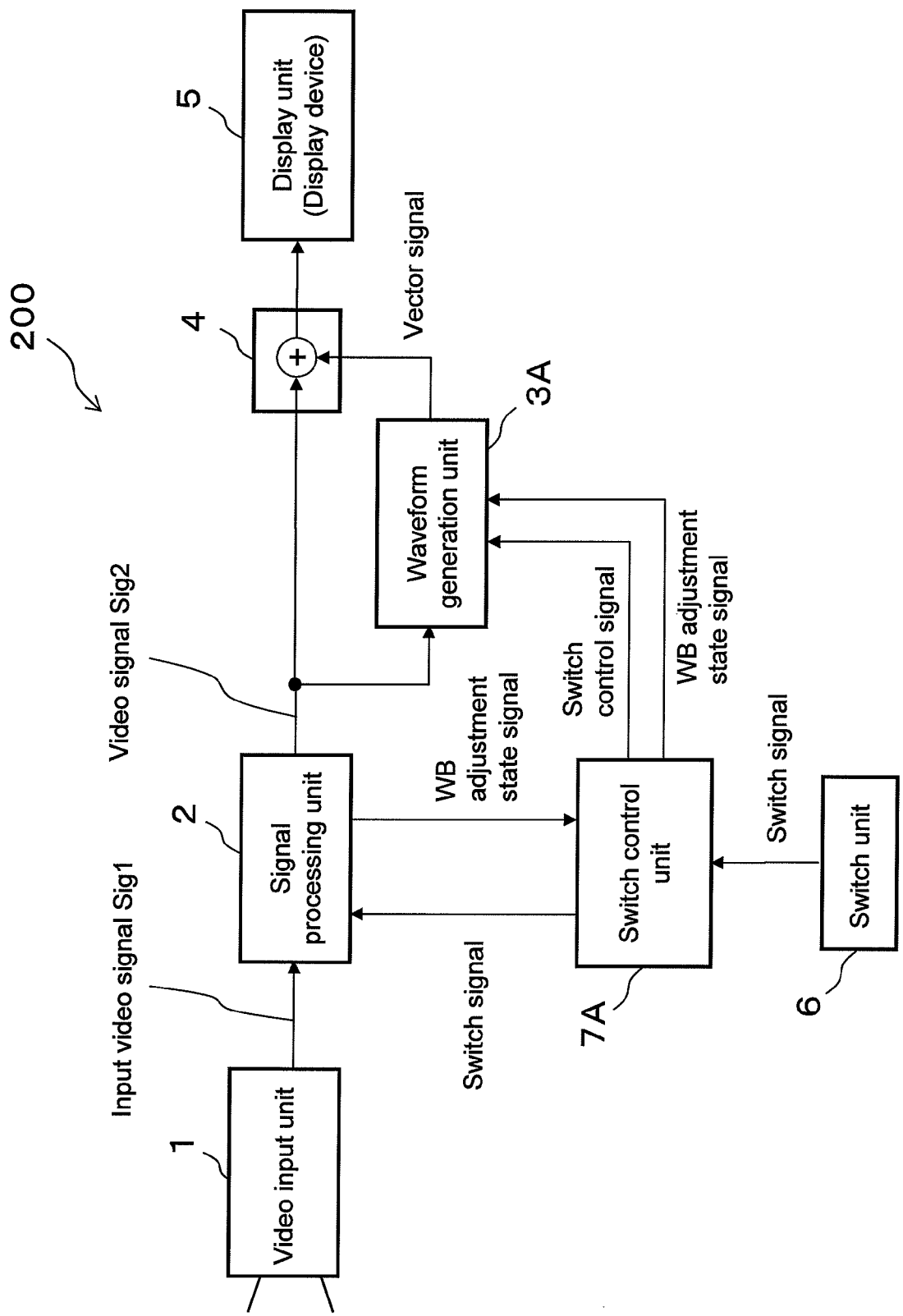
FIG. 10 is a block diagram of an imaging apparatus 200 according to a second embodiment of the present invention.
Figure 11:
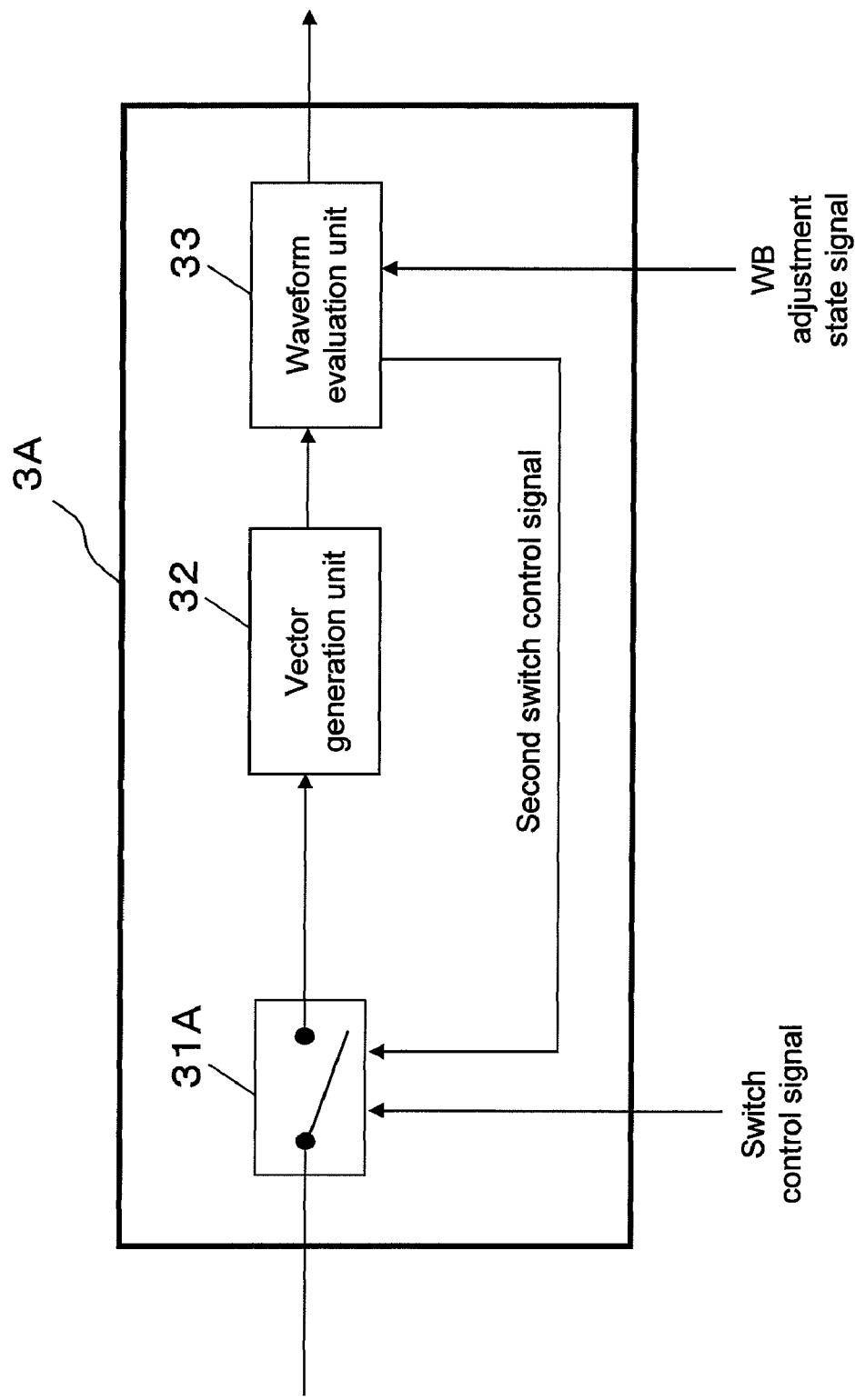
FIG. 11 is a block diagram of a waveform generation unit 3A according to the second embodiment.

FIG. 10 is a block diagram of an imaging apparatus 200 according to the second embodiment. FIG. 11 is a block diagram of a waveform generation unit 3A included in the imaging apparatus 200.

As shown in FIG. 10, the imaging apparatus 200 of the present embodiment has the same structure as the imaging apparatus 100 of the first embodiment except that the waveform generation unit 3 is replaced by the waveform generation unit 3A and the switch control unit 7 is replaced by a switch control unit 7A. The other structure is the same as the structure of the imaging apparatus 100 of the first embodiment and will not be described in detail.

FIG. 11 is a block diagram of the waveform generation unit 3A of the second embodiment. In FIG. 11, the components of the waveform generation unit 3A that are the same as the components of the waveform generation unit 3 in FIG. 3 are given the same reference numerals as those components and will not be described.

The switch control unit 7A differs from the switch control unit 7 of the first embodiment only in that the switch control unit 7A outputs a WB adjustment state signal output from the signal processing unit 2 to a waveform evaluation unit 33 included in the waveform generation unit 3A.

As shown in FIG. 11, the waveform generation unit 3A includes a control switch unit 31A, a vector generation unit 32, and the waveform evaluation unit 33.

The vector generation unit 32 has the same structure as the vector generation unit of the imaging apparatus 100 of the first embodiment.

The control switch unit 31A receives digital video signals (Y signal, Cb signal, and Cr signal) output from the RGB/YCbCr conversion unit 23 of the signal processing unit 2, a switch control signal output from the switch control unit 7, and a second switch control signal output from the waveform evaluation unit 33, and outputs the digital video signals (Y signal, Cb signal, and Cr signal) to the vector generation unit 32 based on the switch control signal and the second switch control signal. More specifically, the switch of the control switch unit 31A is turned on and off based on a result of an OR operation of the switch control signal and the second switch control signal. When one of the switch control signal and the second switch control signal has a value indicating ON, the switch of the control switch unit 31A is turned on. In any other cases, the switch of the control switch unit 31A is turned off.

The waveform evaluation unit 33 receives a vector signal output from the vector generation unit 32 and a WB adjustment state signal output from the switch control unit 7A, and determines the state of WB adjustment based on the vector signal. The waveform evaluation unit 33 outputs the second switch control signal to the control switch unit 31A based on the determination result.

2.2 Operation of the Imaging Apparatus

The operation of the imaging apparatus 200 with the above-described structure will now be described. The operation part that is the same as in the first embodiment will not be described.

The operation of the imaging apparatus 200 will be described taking two cases: one in which white balance adjustment (hereafter may be referred to as "WB adjustment") performed in the white balance adjustment unit 22 has been successful and the other in which WB adjustment has failed.

2.2.1 When WB adjustment has been Successful

The operation of the imaging apparatus 200 when WB adjustment has been successful will now be described with reference to FIG. 12.

Figure 12:
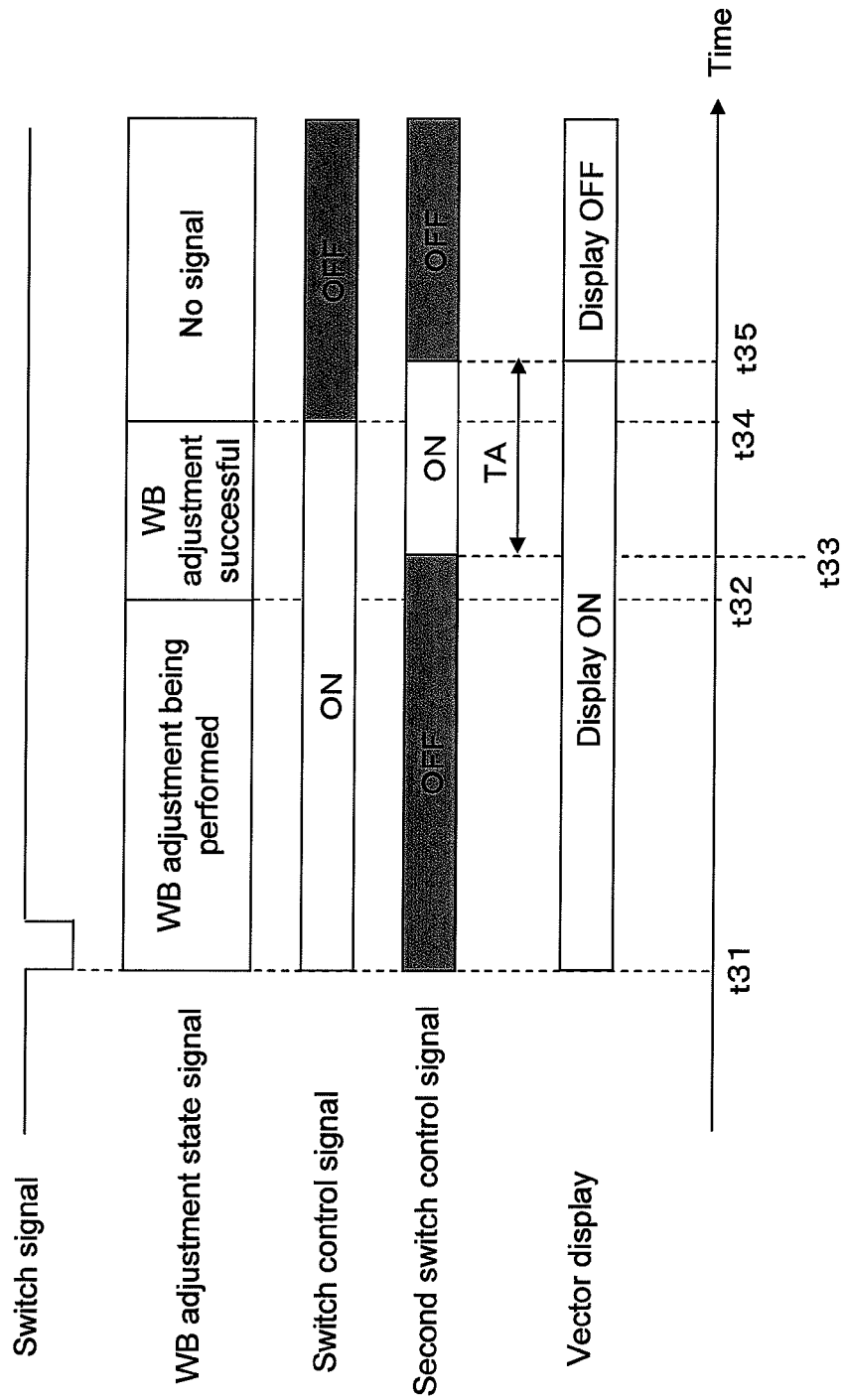
FIG. 12 is a timing chart of signals when WB adjustment has been successful.

FIG. 12 is a timing chart showing the state of the switch signal, the WB adjustment state signal, the switch control signal, the second switch control signal, and the vector display when WB adjustment has been successful.

The WB adjustment state signal and the switch control signal are the same as the signals in the first embodiment and will not be described.

At timing t32, when the WB adjustment state signal is set to the value indicating that WB adjustment has been successful, the waveform evaluation unit 33 determines the state of WB adjustment based on the vector signal, and determines whether WB adjustment is performed in an optimum manner. When determining that WB adjustment is performed in an optimum manner, the waveform evaluation unit 33 sets the second switch control signal to the value indicating ON only for a first predetermined period TA (period TA from timings t33 to t35 in FIG. 12). When determining that WB adjustment is not performed in an optimum manner, the waveform evaluation unit 33 sets the second switch control signal to the value indicating ON only for a second predetermined period TB (>TA) (period TB from timings t43 to t46 in FIG. 13), which is longer than the first period TA.

The state of WB adjustment may for example be determined in the manner described below. For example, when the imaging apparatus 200 is used to capture an image of a scene with an achromatic color, the waveform evaluation unit 33 determines that WB adjustment is performed in an optimum manner if the vector display is included in the region RI shown in FIG. 4. It is preferable to set the region R1 to be a circular region with a predetermined radius.

The control switch unit 31A is controlled based on the result of the OR operation of the switch control signal and the second switch control signal. Thus, as shown in FIG. 12, the control switch unit 31A is set on for the period from the timings t31 to t35. As a result, the vector display is performed in the display unit 5 for the period from the timings t31 to t35.

At timing t35, the switch control signal and the second switch control signal are both set to the value indicating OFF. As a result, the vector display is stopped in the display unit 5.

The period for which the second switch control signal is set to the value indicating ON may not be a period starting from the timing t35 in FIG. 12, but may be a period starting from a timing preceding the timing t34.

2.2.2 When WB Adjustment has Failed

The operation of the imaging apparatus 200 when WB adjustment has failed will now be described with reference to FIG. 13.

Figure 13:
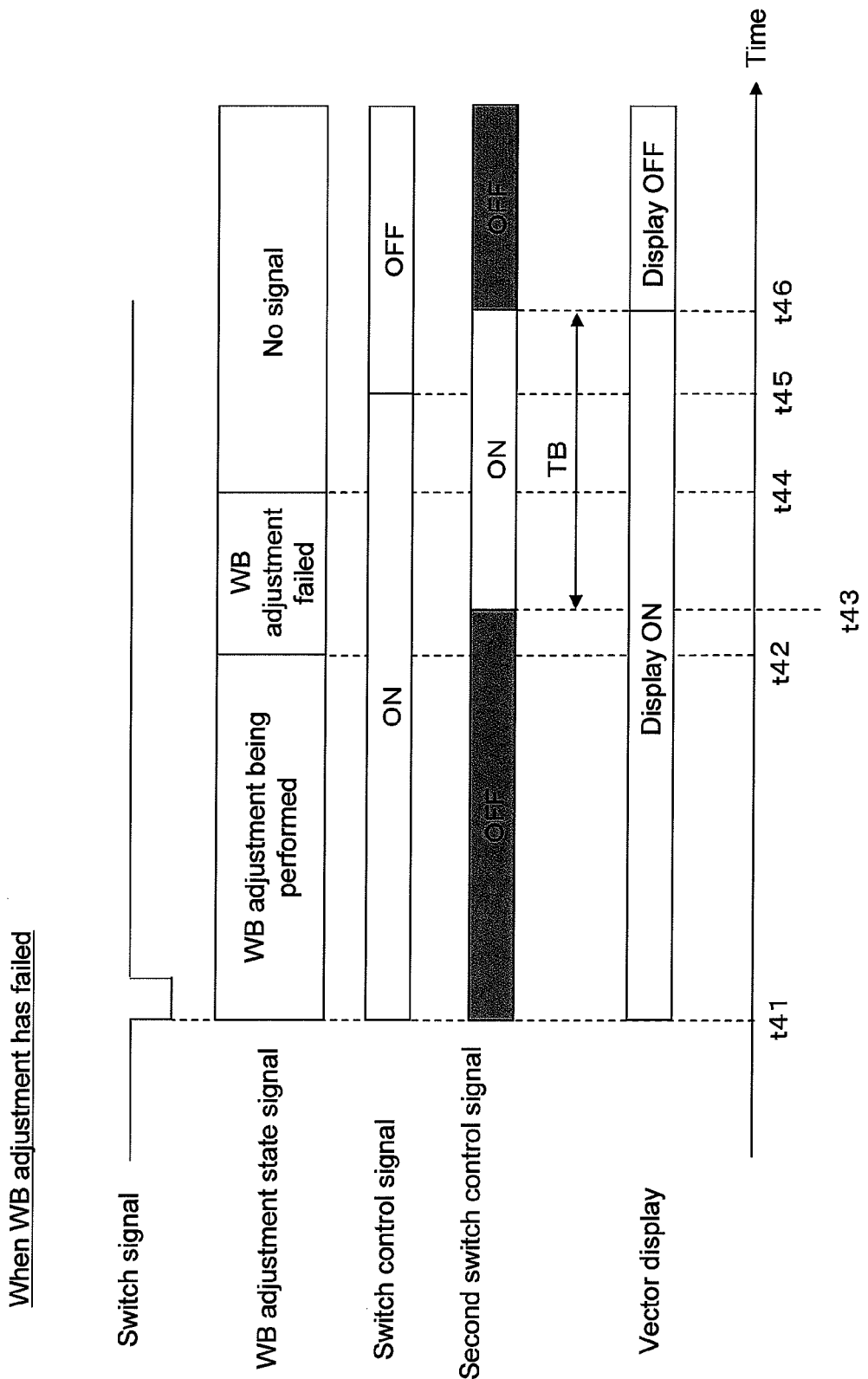
FIG. 13 is a timing chart of signals when WB adjustment has failed.
Figure 14:
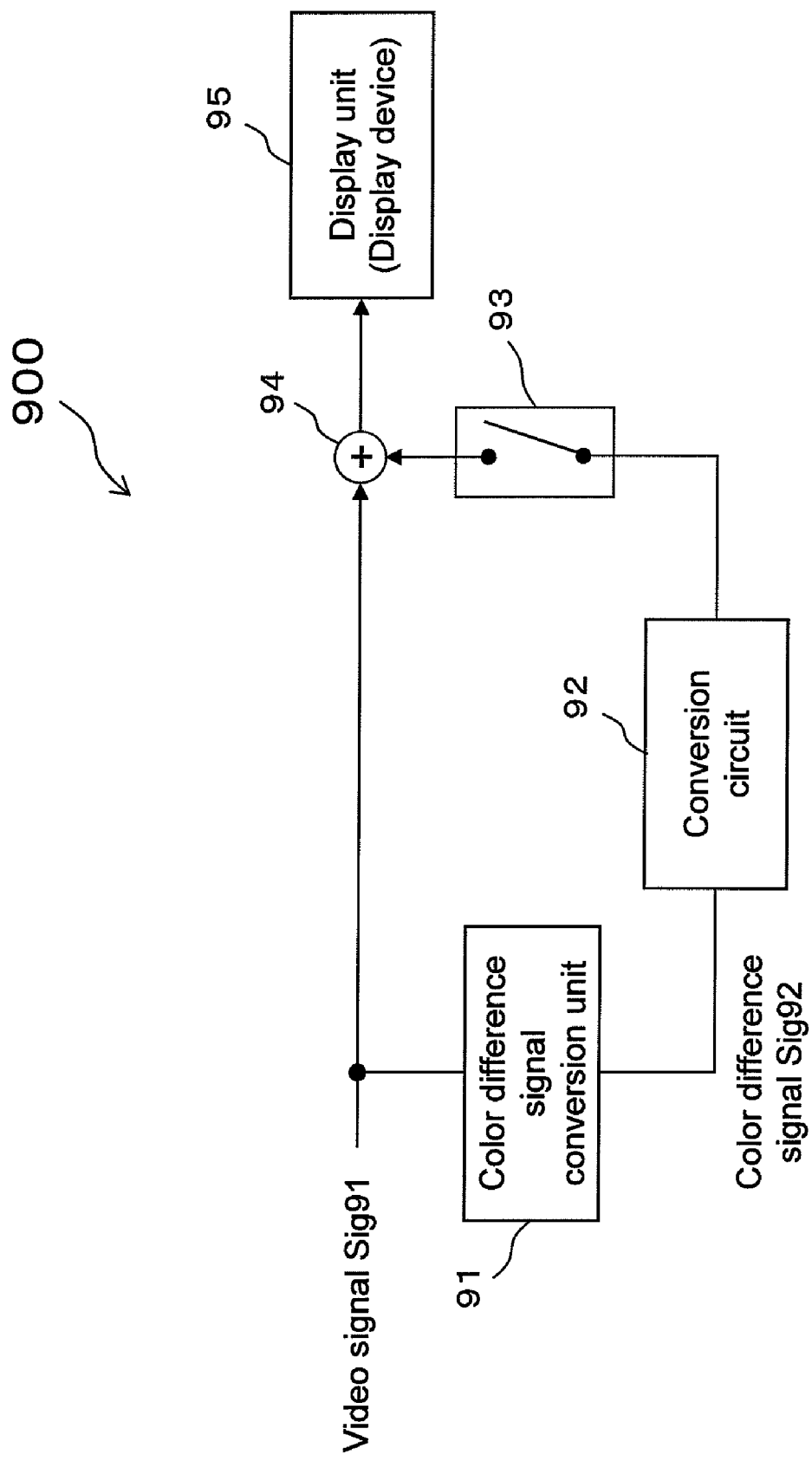
FIG. 14 is a block diagram of a conventional imaging apparatus that can perform a vector display.

FIG. 13 is a timing chart showing the state of the switch signal, the WB adjustment state signal, the switch control signal, the second switch control signal, and the vector display when WB adjustment has failed.

The WB adjustment state signal and the switch control signal are the same as the signals in the first embodiment and will not be described.

At timing t42, when the WB adjustment state signal is set to the value indicating that WB adjustment has failed, the waveform evaluation unit 33 determines the state of WB adjustment based on the vector signal, and determines whether WB adjustment is performed in an optimum manner. When determining that WB adjustment is performed in an optimum manner, the waveform evaluation unit 33 sets the second switch control signal to the value indicating ON only for a first predetermined period TA (period TA from timings t33 to t35 in FIG. 12). When determining that WB adjustment is not performed in an optimum manner, the waveform evaluation unit 33 sets the second switch control signal to the value indicating ON only for a second predetermined period TB (>TA) (period TB from timings t43 to t46 in FIG. 13), which is longer than the first period TA.

The control switch unit 31A is controlled based on the result of the OR operation of the switch control signal and the second switch control signal. Thus, as shown in FIG. 13, the control switch unit 31A is set on for the period from the timings t41 to t46. As a result, the vector display is performed in the display unit 5 for the period from the timings t41 to t46.

At timing t46, the switch control signal and the second switch control signal are both set to the value indicating OFF. Thus, the vector display is stopped in the display unit 5.

As described above, the waveform evaluation unit 33 of the imaging apparatus 200 determines the validity of WB adjustment. When WB adjustment is not performed in an optimum manner, the imaging apparatus 200 performs the vector display for a longer period. This structure enables the user to easily notice the failure in WB adjustment. As a result, the user can avoid producing an unfavorable image using the imaging apparatus 200.

The imaging apparatus 200 may determine the validity of WB adjustment by, for example, comparing the amplitude of the vector signal, that is, the color saturation component of the vector signal, with a predetermined threshold using the waveform evaluation unit 33, and may determine that WB adjustment is valid when the amplitude is equal to or less than the threshold.

As described above, the imaging apparatus 200 enables the user to easily check the result of automatic white balance adjustment, and enables the user to easily notice a failure in WB adjustment when WB adjustment has failed. As a result, the user can avoid producing an unfavorable image using the imaging apparatus 200.

Although the imaging apparatus 200 of the present embodiment determines the validity of WB adjustment by analyzing the vector signal using the waveform generation unit 3A, the imaging apparatus 200 may alternatively determine the validity of WB adjustment by analyzing the video signal output from the signal processing unit 2. When the imaging apparatus 200 determines that WB adjustment is invalid, the waveform generation unit 3A may generate the vector signal for a longer period.

The imaging apparatus 200 may also determine the validity of the result of WB adjustment not only based on the color saturation component of the vector signal but also based on other components, such as the luminance component.

When determining that WB adjustment has failed by analyzing the vector signal, the imaging apparatus 200 may not only perform the vector display for a longer period than in a normal state but also display a message indicating, for example, that WB adjustment has failed on the display unit 5 (display device) together with the video signal and the vector signal.

In the same manner as in the first embodiment, the imaging apparatus 200 of the present embodiment is applicable not only to WB adjustment but also to black balance adjustment.

Other Embodiments

Although the imaging apparatuses 100 and 200 in the above embodiments stop the vector display after the predetermined period even when determining that WB adjustment is not performed in an optimum manner, the present invention should not be limited to this structure. For example, the imaging apparatus 100 or the imaging apparatus 200 may continue the vector display until receiving a user instruction (until the user manually stops the vector display) when determining that WB adjustment is not performed in an optimum manner.

Although the switch signal is based on a negative-true logic in the above embodiments, the switch signal may be based on a positive-true logic.

Although the above embodiments mainly describe the case in which the present invention is applied to white balance adjustment and black balance adjustment, the application of the present invention should not be limited to such adjustments. The present invention is also applicable to other video adjustment processes.

Although the switch signal is input into the signal processing unit 2 from the switch unit 6 via the switch control unit 7 or 7A in the above embodiments, the switch signal may be input into the signal processing unit 2 directly from the switch unit.

Although the WB adjustment state signal is input into the waveform generation unit 3A via the switch control unit 7A in the second embodiment, the WB adjustment state signal may be directly input into the waveform generation unit 3A.

Each block of the imaging apparatus described in each of the above embodiments may be formed using a single chip using a semiconductor device, such as LSI (large scale integration), or some or all blocks of the imaging apparatus may be formed using a single chip.

Although the semiconductor device technology is referred to as LSI, the technology may be instead referred to as IC (integrated circuit), system LSI, super LSI, or ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

Further, if any circuit integration technology that can replace LSI emerges as an advancement of the semiconductor technology or as a derivative of the semiconductor technology, the technology may be used to integrate the functional blocks of the imaging apparatus. Biotechnology is potentially applicable.

The processes described in the above embodiments may be realized using either hardware or software, or may be realized using both software and hardware. When the imaging apparatus of each of the above embodiments is implemented by hardware, the imaging apparatus requires timing adjustment for each of its processes. For ease of explanation, timing adjustment associated with various signals required in an actual hardware design is not described in detail in the above embodiments.

The structures described in detail in the above embodiments are mere examples of the present invention, and may be changed and modified variously without departing from the scope and spirit of the invention.

INDUSTRIAL APPLICABILITY

The imaging apparatus, the waveform signal display method, the storage medium, and the integrated circuit of the present invention enable automatic white balance adjustment to be performed in response to an operation of a switch for automatic white balance adjustment, and enable a vector display combined with (superimposed on) a video to be performed on a display device for a predetermined period. The imaging apparatus, the waveform signal display method, the storage medium, and the integrated circuit of the present invention enable a result of such automatic white balance adjustment to be easily and correctly checked without requiring an external device, such as a vectorscope, and without requiring a special operation. The present invention is therefore applicable to an imaging apparatus or the like having an automatic white balance adjustment function.

What is claimed is:

1. An imaging apparatus, comprising: a switch that starts a video adjustment process; a video input unit that generates a video signal by converting light from a subject; a signal processing unit that processes the video signal through the video adjustment process in accordance with an input from the switch; a waveform generation unit that generates a waveform signal based on the video signal processed by the signal processing unit in accordance with the input from the switch and outputs the waveform signal for a predetermined period, wherein the waveform generation unit determines whether an adjustment result of the video adjustment process is valid based on the waveform signal, and changes an output period for which the waveform signal is output based on a result of the determination and wherein the waveform generation unit sets the output period of the waveform signal as a first period when determining that an adjustment result of white balance adjustment or black balance adjustment is valid based on the waveform signal, and sets the output period of the waveform signal as a second period longer than the first period when determining that the adjustment result of white balance adjustment or black balance adjustment is invalid; a synthesized signal generation unit that generates a synthesized signal by combining the video signal and the waveform signal; and a display unit that displays the synthesized signal.

2. The imaging apparatus according to claim 1, wherein the predetermined period is equal to or longer than a period from when the signal processing unit starts the video adjustment process to when the signal processing unit stops the video adjustment process.

3. The imaging apparatus according to claim 1, wherein the video adjustment process is a white balance adjustment process or a black balance adjustment process.

4. A waveform signal display method used in an imaging apparatus including a switch that starts a video adjustment process and a video input unit that generates a video signal by converting light from a subject, the waveform signal display method comprising: processing the video signal through the video adjustment process in accordance with an input from the switch; generating a waveform signal based on the video signal processed by the signal processing unit in accordance with the input from the switch and outputting the waveform signal for a predetermined period; determining whether an adjustment result of the video adjustment process is valid based on the waveform signal, and changing an output period for which the waveform signal is output based on a result of the determination; setting the output period of the waveform signal as a first period when determining that an adjustment result of white balance adjustment or black balance adjustment is valid based on the waveform signal, and setting the output period of the waveform signal as a second period longer than the first period when determining that the adjustment result of white balance adjustment or black balance adjustment is invalid; generating a synthesized signal by combining the video signal and the waveform signal; and displaying the synthesized signal.

5. A non-transitory storage medium storing a program that enables a computer to implement a waveform signal display method used in an imaging apparatus including a switch that starts a video adjustment process and a video input unit that generates a video signal by converting light from a subject, the waveform signal display method comprising: processing the video signal through the video adjustment process in accordance with an input from the switch; generating a waveform signal based on the video signal processed by the signal processing unit in accordance with the input from the switch and outputting the waveform signal for a predetermined period; determining whether an adjustment result of the video adjustment process is valid based on the waveform signal, and changing an output period for which the waveform signal is output based on a result of the determination; setting the output period of the waveform signal as a first period when determining that an adjustment result of white balance adjustment or black balance adjustment is valid based on the waveform signal, and setting the output period of the waveform signal as a second period longer than the first period when determining that the adjustment result of white balance adjustment or black balance adjustment is invalid; generating a synthesized signal by combining the video signal and the waveform signal; and displaying the synthesized signal.

6. An integrated circuit used in an imaging apparatus including a switch that starts a video adjustment process and a video input unit that generates a video signal by converting light from a subject, the integrated circuit comprising: a signal processing unit that processes the video signal through the video adjustment process in accordance with an input from the switch; a waveform generation unit that generates a waveform signal based on the video signal processed by the signal processing unit in accordance with the input from the switch and outputs the waveform signal for a predetermined period, wherein the waveform generation unit determines whether an adjustment result of the video adjustment process is valid based on the waveform signal, and changes an output period for which the waveform signal is output based on a result of the determination and wherein the waveform generation unit sets the output period of the waveform signal as a first period when determining that an adjustment result of white balance adjustment or black balance adjustment is valid based on the waveform signal, and sets the output period of the waveform signal as a second period longer than the first period when determining that the adjustment result of white balance adjustment or black balance adjustment is invalid; a synthesized signal generation unit that generates a synthesized signal by combining the video signal and the waveform signal; and a display unit that displays the synthesized signal.

* * * * *